July 6, 1937.
L. C. BOGGS
2,086,154
SEPTIC TANK
Filed Nov. 14, 1936
2 Sheets-Sheet 1
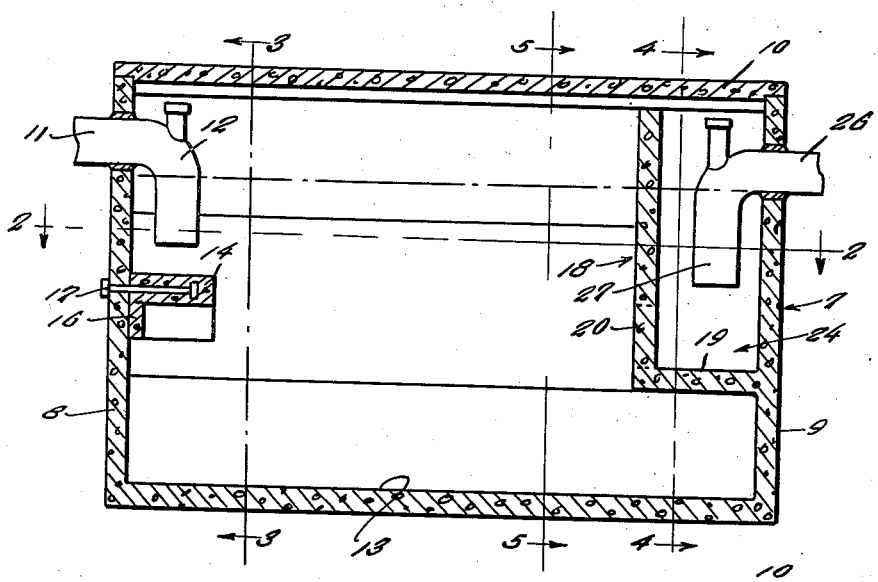
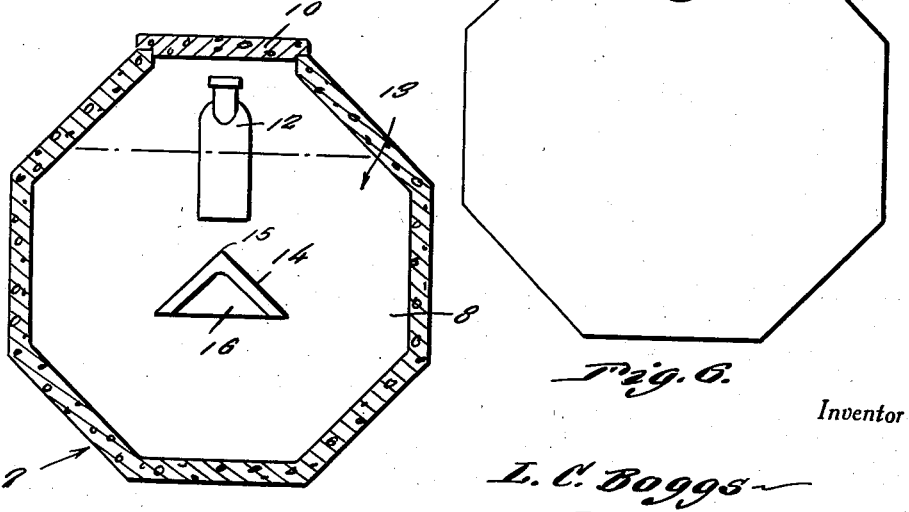
Inventor
L. C. Boggs
By Clarence A. O'Brien
Hyman Berman
Attorneys

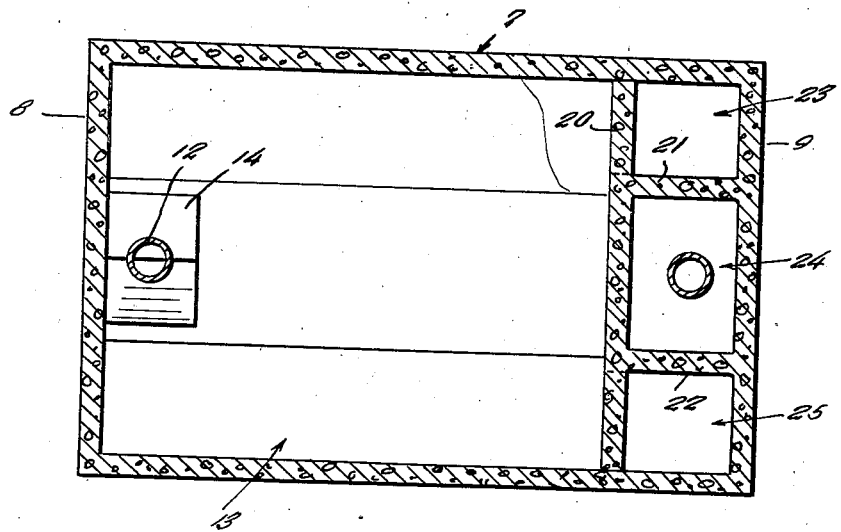
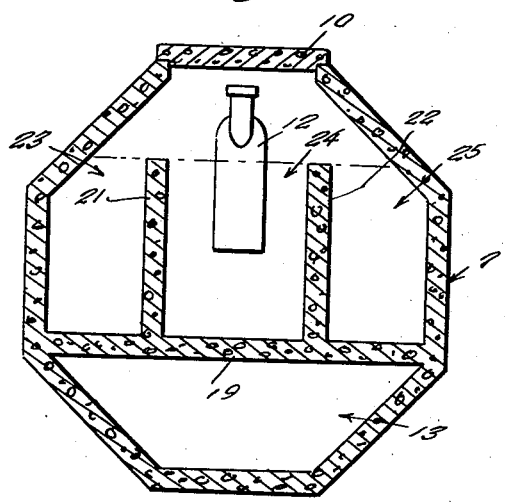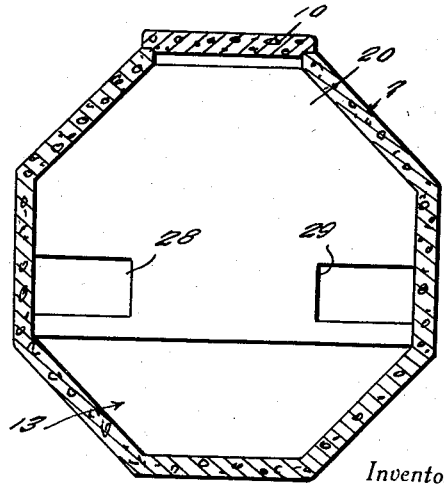

Patented July 6, 1937

2,086,154

UNITED STATES PATENT OFFICE 2,086,154

SEPTIC TANK

Lester C. Boggs, Hollywood, Fla.

Application November 14, 1936, Serial No. 110,923

2 Claims. (Cl. 210—6)

This invention relates to a structurally new and novel septic tank perfected as a well deserved necessity in every suburban community and so perfected and constructed for private use as to justify its endorsement by National, State and local authorities.

Needless to say, I am aware that there are many different types of sanitary sewage disposal systems now in use. It is nevertheless believed that there is room in this particular line of endeavor for a structurally distinct septic tank possessed of more efficient sewage disposal action and characterized by simplicity and durability, whereby to provide the trade with a structure which more aptly fulfills the requirements of a product of this type.

Briefly stated, the improved tank is constructed along scientific lines assuring long life and reliable automatic action. It is odor-proof, provides for lasting satisfaction, and is internally constructed to promote rapid liquification, due to the principle of bacterial action adopted.

A further object of the invention is to generally improve upon cylindrical and rectangular septic tanks by providing one which is hexagonal in cross sectional form, whereby to promote expeditious casting and reliable installation.

More specifically, I have evolved and perfected a so-called hexagonal septic tank having a material breaker baffle at the intake end, and well-designed and scientifically correct liquid disposal means properly retarding the exit at the effluent or discharge end.

Other features and advantages will become more readily apparent from the following description and drawings.

In the accompanying drawings, wherein like numerals are employed to designate like parts throughout the views:

Figure 1 is a view partly in section and partly in elevation disclosing the complete tank as constructed in accordance with the principles of the present inventive conception.

Figure 2 is a horizontal section taken approximately on the plane of the line 2—2 of Figure 1.

Figures 3, 4, and 5 are transverse sections on the lines 3—3, 4—4 and 5—5 respectively, of Figure 1.

Figure 6 is an end elevation observing the structure from either end.

As before indicated, the tank proper, denoted by the numeral 7, is substantially hexagonal in cross sectional form, is longitudinally elongated, and provided with flat end walls 8 and 9, respectively. The removable cover or lid is denoted by the numeral 10 and coordinates with the adjacent converging walls in completing the hexagonal design so needfully desired.

As shown in Figure 1, the inlet or sewage supply pipe is denoted by the numeral 11 and has a downturned spout at 12 emptying into the main chamber or compartment 13 in close proximity to the end wall 8. Located on the interior and directly beneath the discharge nozzle 12 is a substantially triangular baffle unit 14. This has its apex 15 located centrally beneath the discharge end of the nozzle and includes an attaching web or stabilizing element 16 bearing directly against the central inner surface of the end wall 8. This baffle 14 is a separate part and is bolted or otherwise detachably secured in place as at 17. Its purpose is, obviously, to break up the lumps of so-called solid matter to promote the desired anaerobic bacterial multiplication and liquification action in the main chamber 13.

The numeral 18 at the discharge end designates the retardation means or unit. This comprises a horizontal partition 19 extending transversely across the discharge end and spaced above the bottom. Joined to this is a vertical wall or partition 20 which features 19 and 20 form a box. The box in turn is divided internally by partitions 21 and 22 which terminate on a plane spaced downwardly from the removable lid. These additional partitions define three separate chambers 23, 24, and 25.

The discharge or purified liquid conveying pipe is denoted by the numeral 26 and is mounted in the end wall 9 having a depending intake nozzle 27 confined in the chamber 24 with its discharge end terminating in spaced relation above the partition 19, that is, the feature which in effect forms the bottom of said compartment 24. The numerals 28 and 29 designate inlet openings registering with the outer compartment or chambers 23 and 25. It follows, therefore, that the outgoing substantially liquified material first enters the end chambers or compartments 23 and 25 by way of the openings 28 and 29. It then overflows into the central chamber 24 and, seeking its level, is carried off by the nozzle 27 and its pipe line 26.

Specifically and structurally speaking, novelty is thought to reside in the hexagonal formation which not only facilitates construction as a precast unit or a structure which may be cast on the job, but this shape is desirable to facilitate satisfactory anchorage in the ground. Then too, as before indicated, the internal features comprising the breaker baffle and the retardation unit 18 contribute their proportionate share to the provision of a unified whole aptly fitted for the specific purposes intended.

Briefly summarized, the following may be considered as worthy of note:

1. The octagon shape allows simplicity of forms and ease of casting. It is also easier to roll or handle this form of tank. Casting the baffles separately and installing after the tank is cast reduces form adjustment and form cost.

2. Break up baffle is placed under the end of the inlet pipe and tends to break up and distribute the raw sewage in the tank, thus assisting the necessary septic action. Septic action is more rapid on sewage when broken up.

3. The large area shown in the body of the tank for septic action and the large area for the anaerobic activity at the overflow line are advantages. Also the large sediment area in the bottom where solids remain until septic action changes them to liquid is a decided improvement.

4. Attention is also called to the retarding chambers where liquid flow is slowed down and thus longer periods allowed for septic action.

5. The effluent chamber is also to be noted as to its improved form and design.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a septic tank construction of the class described, a concrete tank, a supply pipe connected to one end thereof and including an inlet nozzle depending into the tank, a retardation unit built in the opposite end portion of the tank and including a horizontal partition spaced above the bottom of the tank, a vertical wall attached to said partition and disposed in parallelism with the end wall, said vertical wall extending completely to the top of the tank, and additional partition members cooperating with said horizontal and vertical walls and end wall in defining a box-like retardation device, said last named partitions defining a pair of end compartments and a central intervening compartment, and a discharge pipe having a discharge nozzle confined in said central compartment.

2. A septic tank of the class described comprising a tank longitudinally elongated in design and substantially hexagonal in cross-sectional form, said tank including substantially flat end walls, pipes attached to said end walls and including depending portions confined within the tank, one of said pipes constituting a material inlet, and a material breaker and baffle unit comprising a substantially V-shaped member including a vertical web formed integral with and joining the diverging portions of said member, said web constituting an abutment and bearing against the inner face of one of the end walls of the tank, said baffle unit being so arranged that the apex portion is located centrally beneath and close to the discharge end of said inlet pipe, and said baffle unit being provided with a bolt imbedded therein and extending through the end wall to render it accessible to accommodate a fastener to render the baffle unit detachable, said tank being open at its top to permit access to be had to the baffle unit for removal or replacement purposes.

LESTER C. BOGGS.